Figure 1:
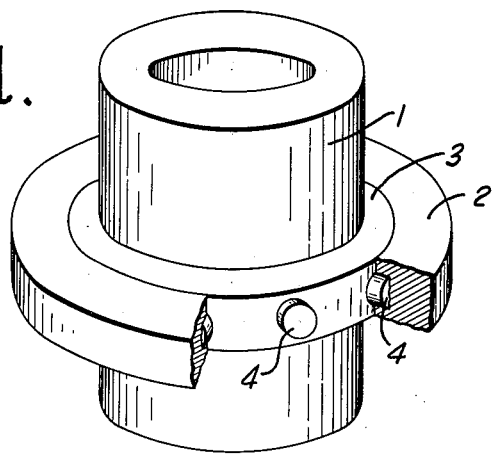

June 25, 1963 J. F. KLEMENT 3,094,753
METHOD OF MAKING A COMPOSITE METAL STRUCTURE
Filed Feb. 4, 1960

INVENTOR.
John F. Klement
BY Andrew + Starke
Attorneys

United States Patent Office 3,094,753
Patented June 25, 1963

3,094,753
METHOD OF MAKING A COMPOSITE METAL STRUCTURE
John F. Klement, Milwaukee, Wis., assignor to Ampco Metal, Inc., Milwaukee, Wis., a corporation of Wisconsin
Filed Feb. 4, 1960, Ser. No. 6,681
3 Claims. (Cl. 22—204)

This invention relates to a composite metal structure and more particularly to a method of casting a composite gear.

Bronze gears are frequently used in a worm drive along with a hardened steel worm. The bronze gears are particularly suitable under conditions of variable loads and where the drive is operated for long periods of time, for the bronze gear will not overheat and requires in cases a minimum of lubrication.

Originally, solid bronze gears were used but as competition became more of a factor, composite gears were designed in which the amount of bronze was reduced and the hub section was formed of a cheaper metal, such as cast iron or steel. In the original composite gears, a bronze gear ring was bolted to a cast iron or steel hub.

In subsequent developments, the bronze ring was keyed to the ferrous hub by means of chill casting in a static mold. In statically casting the bronze gear ring, it was very difficult to provide a proper bond between the bronze and the ferrous hub and, in many cases, it was necessary to secure the bronze ring to the hub by welding.

The present invention is directed to an improved method of fabricating a composite gear in which a bronze ring is centrifugally cast around a preformed central hub consisting of cast iron or steel. According to the invention, the hub is provided with an outwardly extending rim having a series of circumferentially spaced projections. The hub is located in a mold and the bronze is poured into the mold while the mold is being spun about its axis. By properly chilling the outside of the cast bronze ring and controlling the solidification rate of the bronze by means of a riser section, the desired fine grain structure of the bronze is obtained to thereby provide the cast bronze ring with the most desirable mechanical properties.

The present invention provides a relatively inexpensive method of casting an outer gear ring of bronze to a central hub. By controlling the temperature of the metal, the rate of spinning of the mold and the rate of chilling of the cast ring, a fine grain structure is provided which results in a higher yield strength for the gear ring and provides less deformation of the ring in service.

Other objects and advantages of the invention will appear in the following description.

The drawings illustrate the best mode presently contemplated of carrying out the invention.

Figure 2:
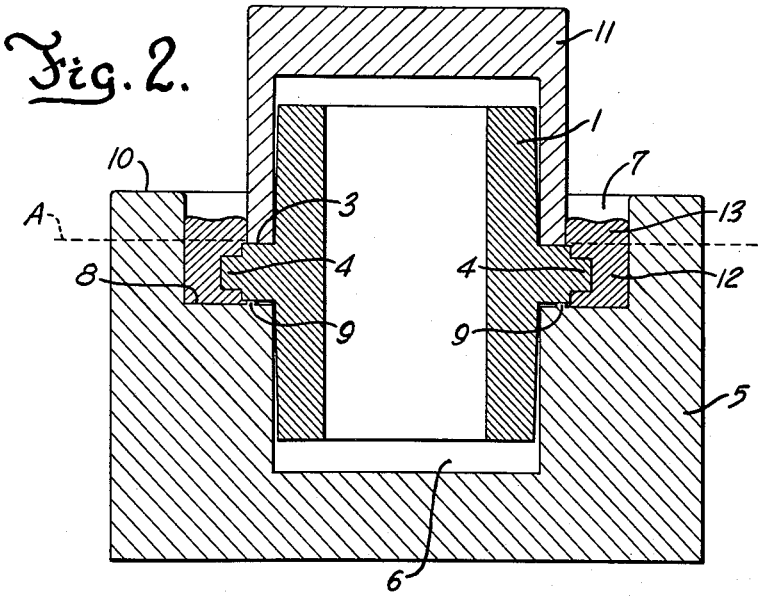

In the drawings:

FIGURE 1 is a perspective view of the completed cast gear structure with a portion of the gear ring broken away to show the projections on the hub rim; and FIG. 2 is a vertical section of the mold with the hub located therein.

The drawings illustrate a gear comprising a central hub 1 and a gear ring 2 which extends outwardly from the central hub portion. As shown in FIGURE 1, the gear ring 2 is shown in the as-cast condition and before the gear teeth have been machined in the blank.

The hub 1 includes an annular flange 3 or rim which extends outwardly from the central portion of the hub, and a series of projections 4 are provided on the periphery of the flange 3. As shown in the drawings, the projections 4 have a generally circular cross section but these projections may have any desired configuration and serve to provide an increased bond between the hub 1 and the cast gear ring 2.

The hub consists of a material, such as cast iron or steel, while the gear ring 2 is cast of a bronze alloy, such as a tin bronze, aluminum bronze, manganese bronze or the like. The following table sets forth the compositional range, in weight percent, of suitable bronze alloys that can be employed for the gear ring 2:

Alloy

|  | No. 1 | No. 2 | No. 3 |
|---|---|---|---|
| Aluminum | 0.5–6.0 | 7.0–12.0 |  |
| Iron | 0.5–4.0 | 1.0–5.0 |  |
| Manganese | 0.5–5.0 | 0–5.0 |  |
| Zinc |  |  | 0–6.0 |
| Nickel |  | 0–5.0 | 0–5.0 |
| Lead |  |  | 0–12.0 |
| Tin |  |  | 5.0–13.0 |
| Copper | balance | balance | balance |

Specific examples of bronze alloys falling within the above proportional limits are as follows:

Alloy

|  | No. 1 | No. 2 | No. 3 |
|---|---|---|---|
| Aluminum | 5.5 | 9.0 |  |
| Iron | 3.0 | 3.0 |  |
| Manganese | 3.5 |  |  |
| Zinc | 25.5 |  |  |
| Nickel |  | 0.5 | 3.5 |
| Lead |  |  | 2.0 |
| Tin |  |  | 10.0 |
| Copper | 62.5 | 87.5 | 84.5 |

According to the invention, the bronze gear ring 2 is centrifugally cast about the central hub. As shown in FIG. 2, the hub 1 is placed in a mold which is provided with a central cavity 6 to receive the lower end of the hub 1 and an annular recess 7 to receive the flange 3 of the hub. The mold 5 can be formed of any suitable material, such as graphite, cast iron, steel or copper. The lower edge of the flange 3 of hub 1 is spaced above the bottom surface 8 of recess 7 by a series of landings 9 which extend upwardly from surface 8. The upper surface 10 of mold 5 is located a substantial distance above the upper edge of flange 3 to provide a space for a riser when pouring the molten bronze into the recess 7.

An annular core 11 is placed around the upper end of hub 1 with the lower end of the core resting on the upper edge of the flange 3 to thereby prevent the molten metal from engaging this surface of the rim.

It is contemplated that a coating can be applied to the flange 3 and projections 4 of the hub 1 prior to casting the bronze. The coating may be of a type to wet the materials and provide a tighter bond and prevent lapping. Coatings which can be employed include alcohol and colloidal graphite, water and colloidal graphite, silica flour and bentonite, zirconium flour, aluminum oxide flour and the like. Furthermore, flux coatings can also be applied to the exposed parts of hub 1 and these materials may include sodium fluoride, potassium fluoride, cryolite and the like.

In casting, the mold is rotated at a slow speed about the axis of the hub and the molten bronze is poured into the recess 7 at a rate so that directional solidification is promoted from the bottom of the mold and from the sides to the top. The pouring temperature is in the range of 1800° F. to 2400° F. and the pouring rate is decreased as the cast bronze 12 reaches the upper portion of the recess 7 or die cavity. Thus, the top portion 13 of the cast bronze ring 12 will help feed the lower portion and aid in producing the desired mechanical properties and metallurgical structure in the gear ring.

In order to provide the desired grain structure to obtain the most desirable mechanical properties in the gear ring, it is necessary to chill the outside of the cast bronze, provide a riser section 13 for the molten bronze and maintain the speed of rotation of the mold within predetermined limits. To provide the necessary chill for the bronze being poured into the die cavity, the temperature of the mold should be between 100° F. and 1000° F. The speed of spinning or rotation should be fairly low in the range of 5 to 500 r.p.m. with a speed of about 35 r.p.m. being particularly satisfactory. As shown in FIG. 2, the riser section 13 extends upwardly from the top of the flange 3, indicated by the dashed line A, to the top of the cast bronze 12. In order to prevent the molten bronze from chilling too quickly and to provide the necessary fine grain structure, the weight of the riser should be in the range of 0.2 to 0.9 times the weight of the gear ring itself. The chilling of the outside of the bronze and the use of the riser section not only provides a fine grain structure, but the micro-constituents also are fine in size. This provides an increase in mechanical properties, such as tensile strength and hardness, and results in a structure which will deform less in service.

For example, a tin bronze has a microstructure which is predominately alpha and contains a second copper-tin phase identified as delta. If the molten tin bronze is chilled too quickly, the delta constituent does not get a chance to appear but is held in solid solution. On the other hand, if the tin bronze is cooled too slowly, the grains become too large and the delta phase develops as a network which surrounds or encompasses the grain boundaries. This network of the delta or copper-tin phase makes the alloy more brittle and weaker along the grain boundaries. However, by chilling the outside of the cast section and providing a riser of proper dimensions, as described above, isolated areas of the delta phase are produced which are evenly distributed throughout the alpha, and this microstructure provides improved wear resistance and hardness for the alloy.

In general, the time of spinning should be greater than one minute per 50 pounds of cast section. For example, for a 50 pound gear ring the spinning time should generally be within the range of 1 to 5 minutes, while for a 250 pound ring, the spinning time will be greater than 10 minutes.

The projections 4, formed on the rim of the hub, provide a tight interlocking fit between the hub and the gear ring on solidification and contraction of the bronze ring. It is advisable to space the projections from the upper and lower faces of the ring 2 so that the metal can approach the top and bottom faces of the hub without folds or laps. If the projections extend axially across the whole width of the flange 3, the molten metal will not completely adhere to the rim. This is caused by the fact that the projections tend to chill the metal and will not allow it to flow completely onto the rim surfaces.

The present invention provides an improved method of casting a bronze gear ring onto a central hub. The casting is accomplished by rotating the hub within a predetermined speed limit while controlling the cooling rate by chilling the outside of the cast bronze and by providing a riser section of given dimension to thereby obtain the desirable fine grain structure. The fine grain structure along with the fine particle size of the micro-constituents provides improved mechanical properties and reduces deformation of the gear ring surfaces in service. With the use of tin bronzes, the tensile strength of the cast gear ring in the as-cast condition will generally be in the range of 40,000 to 70,000 p.s.i., the yield strength from 15,000 to 30,000 p.s.i., the elongation from 2 to 50% and the Brinell hardness under a 500 kg. load is 60 to 120. A manganese bronze cast in the manner of the invention will have a tensile strength in the range of 60,000 to 110,000 p.s.i., a yield strength of 25,000 to 70,000 p.s.i., an elongation of 10 to 30% and a Brinell hardness of 110 to 240, while an aluminum bronze gear ring will have a tensile strength in the range of 65 to 110,000 p.s.i., a yield strength of 25,000 to 60,000 p.s.i., an elongation of 8 to 35% and a Brinell hardness of 130 to 230.

Various modes of carrying out the invention are contemplated as being within the scope of the following claims particularly pointing out and distinctly claiming the subject matter which is regarded as the invention.

I claim:

1. A method of centrifugally casting an outer bronze member on a central core, comprising the steps of disposing the core having an outer surface to receive the member within a mold, heating the mold to a temperature in the range of 100° to 1000° F., rotating the mold about the axis of the core at a speed of 5 to 500 r.p.m., pouring the molten bronze at a temperature in the range of 1800° F. to 2400° F. into the rotating mold and into contact with said surface to form the member and continuing the pouring of said bronze around the entire circumference of the core above the upper extremity of said surface to form an annular riser, terminating the pouring when said riser has a weight in the range of 0.2 to 0.9 times the weight of the member, and solidifying the molten bronze to form an outer member integral with the core with said outer bronze member having a fine grain structure and having micro-constituents of fine size.

2. The method of claim 1 in which the bronze contains 5.0 to 13.0% tin, and the solidified bronze ring in the as-cast condition has a tensile strength in the range of 40,000 to 70,000 p.s.i., a yield strength in the range of 15,000 to 30,000 p.s.i. and a Brinell hardness under a 500 kg. load of 60 to 120.

3. A method of centrifugally casting a bronze gear ring onto an axially extending surface of an outwardly projecting annular rim of a central hub, said surface being provided with a series of surface deviations spaced from the axial extremities of said surface, comprising the steps of disposing the hub within a die cavity in a mold with the axial surface of the rim being spaced a substantial distance from a wall of the die cavity, rotating the mold about the axis of the hub at a speed of 5 to 500 r.p.m., heating the mold to a temperature in the range of 100° to 1000° F., casting the molten bronze at a temperature in the range of 1800° F. to 2400° F. into the die cavity in contact with said surface to form the gear ring, continuing the pouring of said molten bronze beyond the upper extremity of said surface to provide an annular riser, terminating the pouring when the riser has a weight of 0.2 to 0.9 times the weight of the gear ring, said heated mold and said riser serving to provide a fine grain bronze structure having fine particle size micro-constituents to thereby improve the mechanical properties and deformation characteristics of the gear ring, and thereafter solidifying the molten bronze to provide an integral structure.

References Cited in the file of this patent

UNITED STATES PATENTS

| 2,117,106 | Silliman | May 10, 1938 |
| 2,231,427 | Larsh et al. | Feb. 11, 1941 |
| 2,283,152 | Wright | May 12, 1942 |
| 2,420,003 | Miller | May 6, 1947 |
| 2,623,254 | Proctor | Dec. 30, 1952 |
| 2,946,104 | Martin | July 26, 1960 |

FOREIGN PATENTS

| 21,213 | Great Britain | Aug. 31, 1895 |
| 260,390 | Great Britain | Nov. 4, 1926 |